(12) United States Patent
Jee

(10) Patent No.: US 9,046,082 B2
(45) Date of Patent: Jun. 2, 2015

(54) ACTUATOR USING SHAPE MEMORY ALLOY

(71) Applicant: KOREA INSTITUTE OF SCIENCE AND TECHNOLOGY, Seoul (KR)

(72) Inventor: Kwang Koo Jee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 220 days.

(21) Appl. No.: 13/683,372

(22) Filed: Nov. 21, 2012

(65) Prior Publication Data

US 2014/0007571 A1     Jan. 9, 2014

(30) Foreign Application Priority Data

Jul. 5, 2012  (KR) .................. 10-2012-0073491

(51) Int. Cl.
*F03G 7/06* (2006.01)
(52) U.S. Cl.
CPC ...................................... *F03G 7/065* (2013.01)
(58) Field of Classification Search
CPC ........... F03G 7/06; F16K 31/08; F16K 31/00; F02G 1/04
USPC .................................................... 60/527–529
See application file for complete search history.

(56) References Cited

U.S. PATENT DOCUMENTS

| 4,646,523 | A  | * | 3/1987  | O'Hare ........................... 60/527 |
| 6,404,098 | B1 | * | 6/2002  | Kayama et al. ................ 310/307 |
| 6,633,095 | B1 | * | 10/2003 | Swope et al. ............... 310/12.19 |
| 7,331,616 | B2 | * | 2/2008  | Brei et al. ..................... 292/100 |
| 8,072,302 | B2 | * | 12/2011 | Liang et al. .................... 335/229 |
| 8,707,694 | B2 | * | 4/2014  | Olson et al. ...................... 60/527 |
| 2005/0199455 | A1 | * | 9/2005 | Browne et al. ............. 188/266.4 |
| 2009/0167108 | A1 | * | 7/2009 | Yang .............................. 310/306 |
| 2010/0243077 | A1 | * | 9/2010 | Grimseth et al. ................ 60/527 |

FOREIGN PATENT DOCUMENTS

| JP | 2002-163764 A | 6/2002 |
| JP | 2004-341094 A | 12/2004 |
| JP | 2011-231721 A | 11/2011 |

OTHER PUBLICATIONS

KIPO Office Action dated May 22, 2013; Appln. No. 10-2012-0073491.
Korean Intellectual Property Office Notice of Allowance dated Nov. 25, 2013; Appln. No. 10-2012-0073491.

* cited by examiner

*Primary Examiner* — Christopher Jetton
*Assistant Examiner* — Shafiq Mian
(74) *Attorney, Agent, or Firm* — Ladas & Parry LLP

(57) ABSTRACT

A shape memory alloy (SMA) actuator. The SMA actuator, which generates an operating force by using SMA elements, includes fixed member, movable member mounted on fixed member to move between first position and second position, first SMA element mounted to positionally move the movable member to the first position, a second SMA element mounted to positionally move the movable member to second position, a first position fixing means for positionally fixing the movable member at the first position by a magnetic force in such a way that the movable member is separable from first position fixing means, and second position fixing means for positionally fixing the movable member at the second position by a magnetic force in such a way that the movable member is separable from the second position fixing means. According to the present invention, a high reaction speed and remarkably reduced power consumption can be provided.

20 Claims, 4 Drawing Sheets

ACTUATOR USING SHAPE MEMORY ALLOY

CROSS-REFERENCE TO RELATED PATENT APPLICATION

This application claims the benefit of Korean Patent Application No. 10-2012-0073491, filed on Jul. 5, 2012, in the Korean Intellectual Property Office, the disclosure of which is incorporated herein in its entirety by reference.

BACKGROUND OF THE INVENTION

1. Field of the Invention

The present invention relates to an actuator using a shape memory alloy (SMA), and more particularly, to an SMA actuator which has a high reaction speed and remarkably reduced power consumption.

2. Description of the Related Art

A shape memory alloy (SMA) actuator may be classified into a so-called 'passive actuator' which operates according to a change in ambient temperature and a so-called 'active actuator' which uses phase transformation caused by ohmic heat through flow of current.

The passive SMA actuator mostly shows a behavior proportional to ambient temperature, and the active SMA actuator mostly operates in an ON/OFF-type fashion. In particular, because of many advantages, such as lightweight, low cost, and a noise-free feature, the active SMA actuator is used in place of a solenoid, a motor, and so forth in various fields such as vehicles, cameras, electric home appliances, etc.

FIGS. 1 and 2 show an example of a conventional active SMA actuator 1. The conventional active SMA actuator 1 includes an SMA element 2 which is in the form of a wire and has one end portion that is positionally fixed, a movable member 4 which couples to the other end portion of the SMA element 2 and is positionally movable between a first position and a second position, and a counterpart spring 3 which couples to the movable member 4 and elastically biases the SMA element 2 in a direction the SMA element 2 extends.

Thus, if electric current flows in the SMA element 2 according to a signal of a controller (not shown), and thus ohmic heat is generated, then the SMA element 2 contracts to its original state and the movable member 4 is located at the first position as shown in FIG. 1.

Since the SMA element 2 is in a high-temperature phase (austenite phase) at a high temperature, a contractile force generated by the SMA element 2 is larger than that of the counterpart spring 3, such that the SMA element 2 contracts and the counterpart spring 3 extends, as shown in FIG. 1. In this state, the power has to be continuously supplied to fix the movable member 4 at the first position.

If the electric current in the SMA element 2 is short-circuited according to a signal of the controller and thus the ohmic heat is removed, the temperature decreases. Since the SMA element 2 is in a low-temperature phase (martensitic phase) at a low temperature, the contractile force capable of resisting extension of the SMA element 2 is smaller than that of the counterpart spring 3 and thus the SMA element 2 is likely to be deformed, such that the counterpart spring 3 contracts, the SMA element 2 extends, and the movable member 4 positionally moves to the second position. If a wire diameter of the counterpart spring is 0.3 mm, it takes about 9-10 seconds to cool the counterpart spring 3 from 90° C. to room temperature of 20° C., such that about 10 seconds are required for the movable member 4 to move from the first position to the second position.

Generally, the conventional active SMA actuator 1 is used in an ON/OFF operating manner, and does not operate in a proportional fashion like a passive actuator. In the conventional active SMA actuator 1, an SMA element in the form of a coil spring capable of generating a tensile force or a compressive force may be used in place of the SMA element 2 in the form of a wire. The counterpart spring 3 may also be any other spring capable of generating a compressive force.

However, the conventional active SMA actuator 1 has a limited application range because of several problems.

A first problem is power. As shown in FIG. 1, to maintain the SMA element 2 in a contracted state, the high-temperature phase has to be maintained by continuously supplying power to the SMA element 2 (ON state), resulting in high power consumption. If the power supplied to the SMA element 2 is cut off (OFF state), the state unintentionally returns to the state shown in FIG. 2, such that due to this power problem, the application of the conventional active SMA actuator 1 to a cellular phone, a camera, etc., which uses a compact battery is limited.

A second problem is heating speed and cooling speed. The SMA element 2 needs to be rapidly heated and maintained at a proper constant temperature, but it is difficult to determine proper current to be supplied. If the current is too high, the SMA element 2 may be heated rapidly, but it may also be overheated due to continuous heating; whereas if the current is too low, much time is required to heat the SAM element 2 in spite of avoiding to overheat the SMA element 2.

If current supply is stopped according to the signal of the controller as shown in FIG. 2, the SMA element 2 should be rapidly cooled and immediately enter the low-temperature phase (martensitic phase), but a relatively long time is required to cool the SMA element 2 because the SMA element 2 is cooled in an air convection manner. This problem becomes worse especially when the diameter of the wire-type SMA element 2 is large or the SMA element 2 is installed in a closed space.

As a result, the conventional active SMA actuator 1 has much power consumption because power has to be continuously supplied in the high-temperature phase (austenite phase), and has a low reaction speed because it takes about 10 seconds to cool the conventional active SMA actuator 1 from the high-temperature phase to the low-temperature phase due to the stop of current supply.

SUMMARY OF THE INVENTION

The present invention provides a shape memory alloy (SMA) actuator which has a high reaction speed and remarkably reduced power consumption. According to an aspect of the present invention, there is provided an actuator which generates an operating force by using SMA elements, the actuator including a fixed member, a movable member mounted on the fixed member to move between a first position and a second position, a first SMA element mounted to positionally move the movable member to the first position, a second SMA element mounted to positionally move the movable member to the second position, a first position fixing means for positionally fixing the movable member at the first position by a magnetic force in such a way that the movable member is separable from the first position fixing means, and a second position fixing means for positionally fixing the movable member in the second position by a magnetic force in such a way that the movable member is separable from the second position fixing means.

After the movable member positionally moves to and is positionally fixed at one of the first position and the second position, the movable member may be positionally fixed at one of the first position and the second position in spite of the absence of energy supply to the first SMA element and the second SMA element.

The first SMA element and the second SMA element may be supplied with energy from an external source for a predetermined time such that the movable member positionally moves to and is positionally fixed at one of the first position and the second position.

At an instance when the movable member positionally moves to and is positionally fixed on one of the first position and the second position, energy supply to the first SMA element and the second SMA element may be cut off.

The first SMA element and the second SMA element may be SMAs which contract in high-temperature phases and extend in low-temperature phases.

The first SMA element and the second SMA element may be disposed to apply forces in opposite directions to the movable member in the high-temperature phases.

The first SMA element and the second SMA element may be linear wires or coil-type springs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an embodiment of the present invention will be described in detail with reference to the accompanying drawings.

Figure 1:
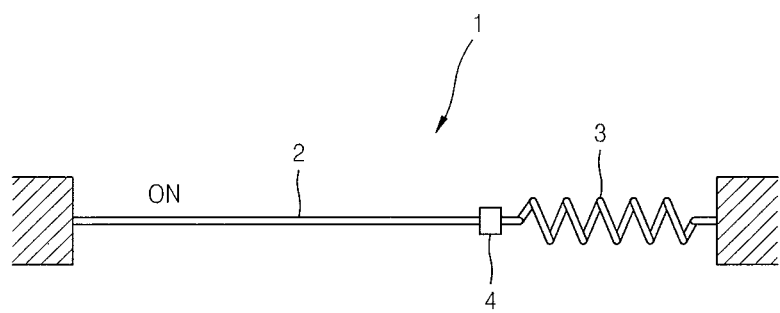
FIG. 1 is a diagram in which power is supplied to a conventional active shape memory alloy (SMA) actuator (ON state)
Figure 2:
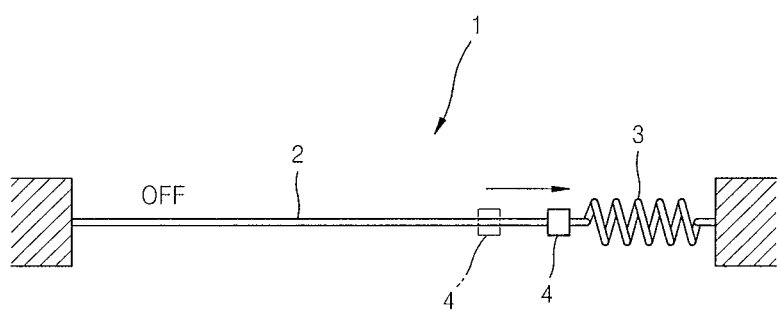
FIG. 2 is a diagram in which power supply to the active SMA actuator shown in FIG. 1 is cut off (OFF state)
Figure 3:
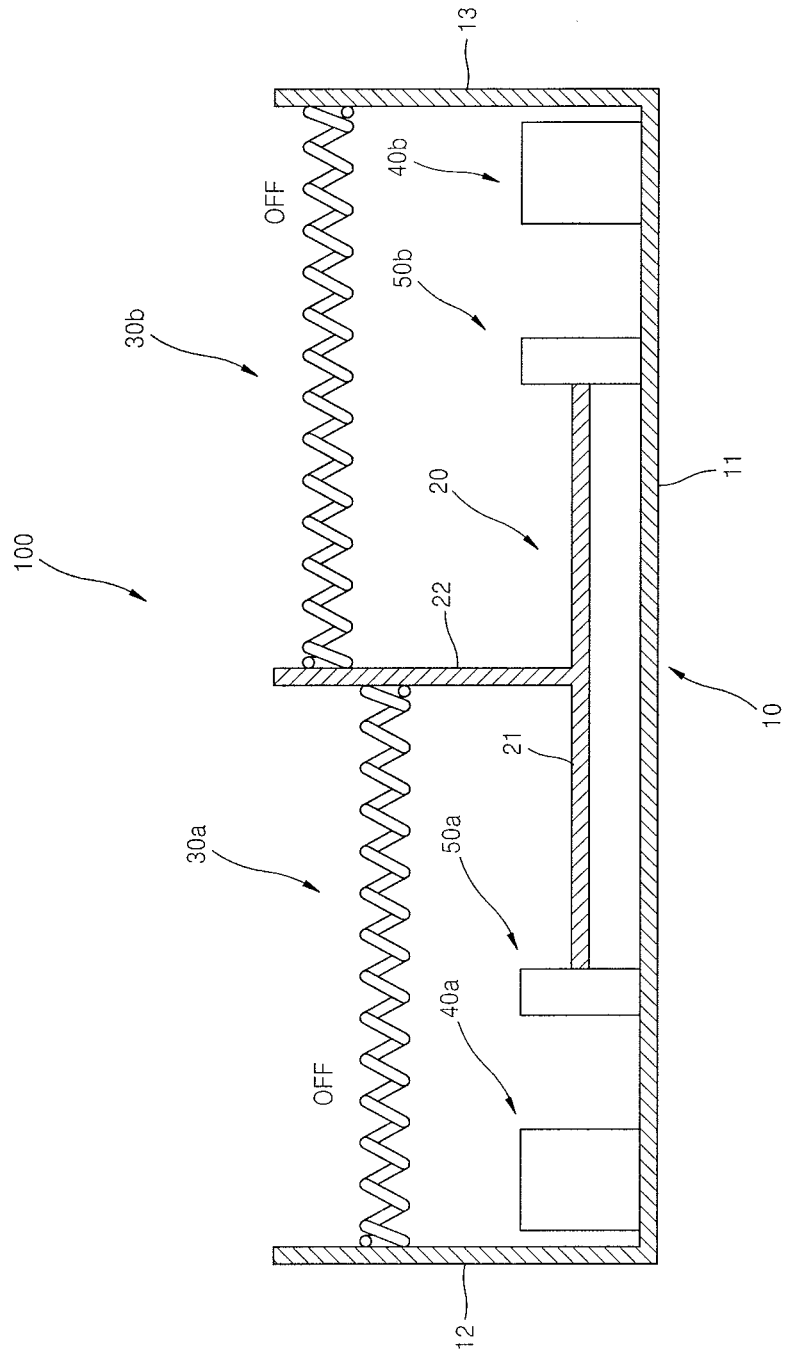
FIG. 3 is a diagram showing a structure of an SMA actuator according to an embodiment of the present invention.

FIG. 3 is a diagram showing a structure of a shape memory alloy (SMA) actuator according to an embodiment of the present invention.

Referring to FIG. 3, an SMA actuator 100 according to an embodiment of the present invention is an actuator which generates an operation force through first and second SMA elements 30a and 30b. The SMA actuator 100 may include a fixed member 10, a movable member 20, the SMA elements 30a and 30b, a first position fixing means, and a second position fixing means.

The fixed member 10, which is a sort of housing, may include a base portion 11, a left side portion 12, and a right side portion 13.

The base portion 11 extends long to the left and to the right in a horizontal direction.

The left side portion 12 protrudes upwardly from a left end portion of the base portion 11.

The right side portion 13 is disposed spaced apart from and in parallel with the left side portion 12, and protrudes upwardly from a right end portion of the base portion 11.

The movable member 20 is disposed on a top surface of the base portion 11 of the fixed member 10, and is mounted on the fixed member 10 in such a way to positionally reciprocate between a first position which is adjacent to the left side portion 12 and a second position which is adjacent to the right side portion 13.

The movable member 20 may include a horizontal portion 21 extending long to the left and to the right in the horizontal direction and a vertical portion 22 protruding upwardly from a center of the horizontal portion 21.

The first and second SMA elements 30a and 30b are coil-type springs manufactured with a Ni—Ti-based SMA. The SMA elements 30a and 30b may include a first SMA element (corresponding to the SMA element 30a) and a second SMA element (corresponding to the SMA element 30b).

The SMA elements 30a and 30b contract in a high-temperature phase (austenite phase) and extend in a low-temperature phase (martensitic phase). The SMA elements 30a and 30b have characteristics of a wire diameter of 0.3 mm, a coil diameter of 2.0 mm, an austenite transformation start temperature (As) of 50° C., and an austenite transformation end temperature (Af) of 70° C., and have the same length.

The SMA elements 30a and 30b are heated and enter the high-temperature phase (austenite phase) when they are supplied with power from an external source (ON state), and slowly transit to the low-temperature phase (martensitic phase) when the power supply from the external source is cut off (OFF state).

The first SMA element 30a is mounted to connect the left side portion 12 of the fixed member 10 with the vertical portion 22 of the movable member 20, such that the first SMA element 30a positionally moves the movable member 20 to the first position by contracting in a power supply state (ON state).

The second SMA element 30b is mounted to connect the right side portion 13 of the fixed member 10 with the vertical portion 22 of the movable member 20, such that the second SMA element 30b positionally moves the movable member 20 to the second position by contracting in the power supply state (ON state).

Thus, the second SMA element 30b may apply a force in an opposite direction to the first SMA element 30a to the movable member 20 in the high-temperature phase (austenite phase).

In the current embodiment, if a current of 2 A flows at room temperature of 20° C. in the SMA elements 30a and 30b, the temperature reaches about 90° C., such that the SMA elements 30a and 30b contract, and in this case, a contractile force of the SMA elements 30a and 30b is about 2.5 N. The contractile force of the SMA elements 30a and 30b in the low-temperature phase is measured to be about 0.6 N.

It takes about 9-10 seconds for the SMA elements 30a and 30b to be cooled to room temperature of 20° C. from the temperature of 90° C.

The first position fixing means fixes the movable member 20 at the first position by a magnetic force in such a way that movable member 20 may be separated from the first position fixing means. In the current embodiment, the first position fixing means may include a first coupling member 50a and a first magnet 40a.

The first coupling member 50a is a metallic member which may couple to a magnet, and couples to a left end portion of the horizontal portion 21.

The first magnet 40a is a permanent magnet which detachably couples to the first coupling member 50a, and couples to the left end portion of the base portion 11 of the fixed member 10.

Therefore, as the first coupling member 50a reaches a predetermined distance from the first magnet 40a, the first coupling member 50a and the first magnet 40a are coupled to each other. If an external force greater than a magnetic force of the first magnet 40a is exerted, the first coupling member 50a may be separated from the first magnet 40a.

The second position fixing means fixes the movable member 20 at the second position by a magnetic force in such a way that movable member 20 may be separated from the second position fixing means. In the current embodiment, the second position fixing means may include a second coupling member 50b and a second magnet 40b.

The second coupling member 50b is a metallic member which may couple to a magnet, and couples to a right end portion of the horizontal portion 21.

The second magnet 40b is a permanent magnet which detachably couples to the second coupling member 50b, and couples to the right end portion of the base portion 11 of the fixed member 10.

Thus, as the second coupling member 50b reaches a predetermined distance from the second magnet 40b, the second coupling member 50b and the second magnet 40b are coupled to each other. If an external force greater than a magnetic force of the second magnet 40b is exerted, the second coupling member 50b may be separated from the second magnet 40b.

In the current embodiment, the magnetic forces of the first magnet 40a and the second magnet 40b generate an attractive force of about 1 N.

Hereinafter, examples of an operating principle and a use method of the above-described SMA actuator 100 will be described.

Referring to FIG. 3, when power supply to both of the SMA elements 30a and 30b is cut off (OFF state), they are both in the low-temperature phase (martensitic phase), such that they do not generate contractile forces or they generate a little contractile forces of the same magnitude. Thus, the movable member 20 is stopped when being positioned in a center portion of the fixed member 10.

Figure 4:
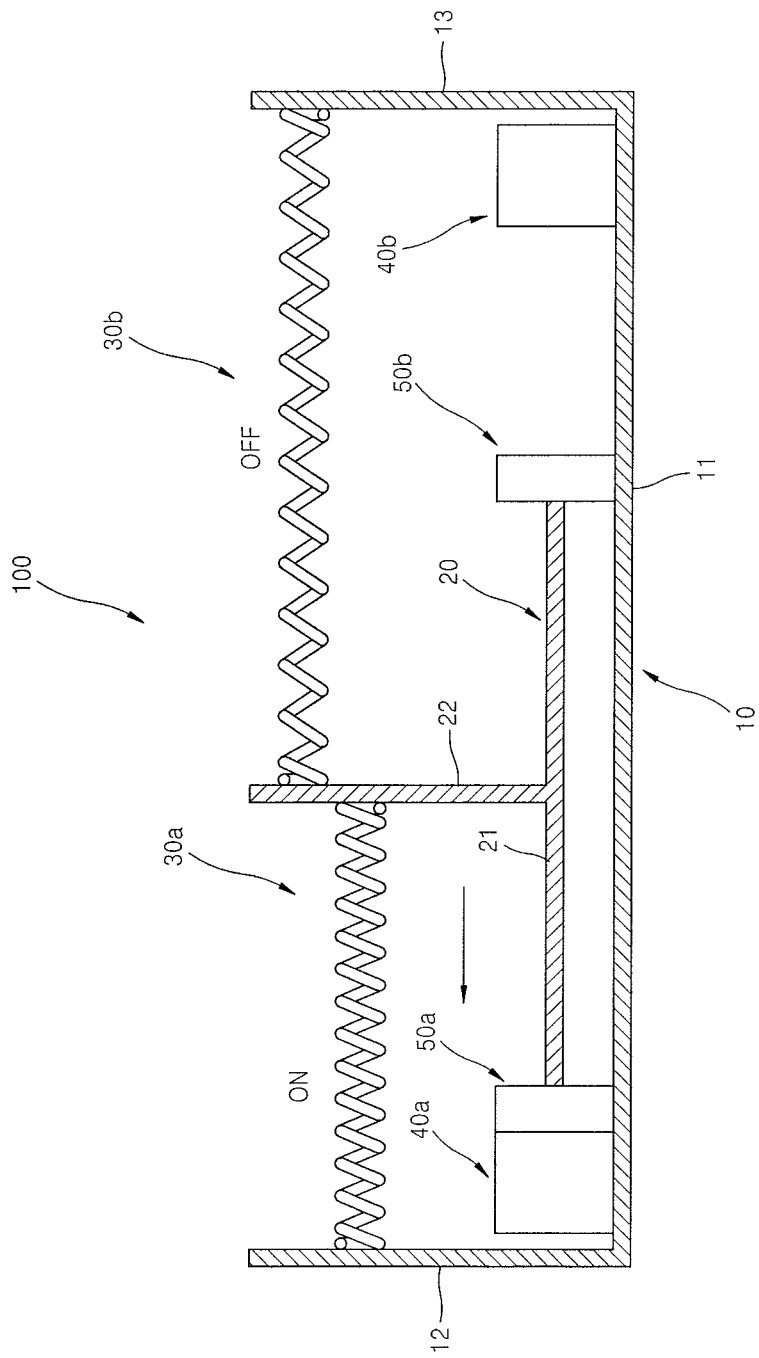
FIG. 4 is a diagram in which power is supplied to a first SMA element of the SMA actuator shown in FIG. 3 (ON state) and power supply to a second SMA element of the SMA actuator shown in FIG. 3 is cut off (OFF state)
Figure 5:
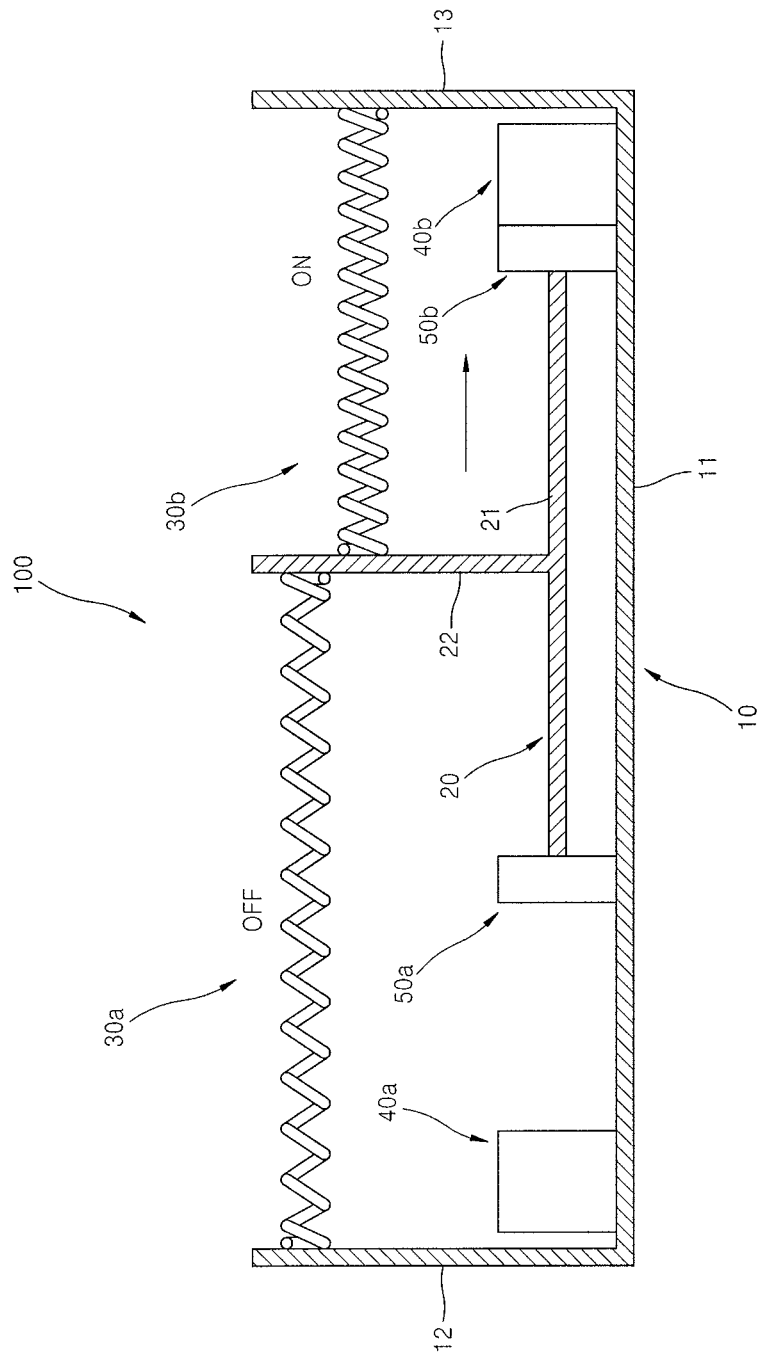
FIG. 5 is a diagram in which power supply to the first SMA element of the SMA actuator shown in FIG. 3 is cut off (OFF state) and power is supplied to the second SMA element of the SMA actuator shown in FIG. 3 (ON state).

In this state, as shown in FIG. 4, if power is supplied to the first SMA element 30a for a predetermined time of 1 second (ON state), the first SMA element 30a enters the high-temperature phase (austenite state) and thus contracts. Due to the contractile force of the first SMA element 30a, the movable member 20 positionally moves to the first position.

Herein, a power supply time of 1 second is a time longer than a minimal time necessary for positional movement of the movable member 20 to one of the first position and the second position, and may be set to a different value according to the shapes or characteristics of the SMA elements 30a and 30b, a distance between the first magnet 40a and the first coupling member 50a, and so forth.

Although the second SMA element 30b in the low-temperature phase (martensitic phase) generates the contractile force, the generated contractile force, 0.6 N, is smaller than that of the first SMA element 30a in the high-temperature phase (austenite phase), 2.5 N, such that the second SMA element 30b in the low-temperature phase may not stop positional movement of the movable member 20 to the first position.

Once the movable member 20 positionally moves to the first position in this way, the first coupling member 50a sticks to the first magnet 40a, such that the movable member 20 is separably fixed at the first position.

Since power is supplied to the first SMA element 30a only for 1 second, after the movable member 20 positionally moves to the first position and is positionally fixed at the first position, there is no electric energy supply to the SMA elements 30a and 30b, and in spite of the absence of the electric energy supply, the movable member 20 may maintain a fixed state at the first position due to the first magnet 40a and the first coupling member 50a, and the first SMA element 30a is slowly cooled and enters the low-temperature phase (martensitic phase) after about 10 seconds from the cut-off of the power supply.

If power is supplied to the second SMA element 30b for a predetermined time of 1 second after both of the SMA elements 30a and 30b enter the low-temperature phase (martensitic phase), the second SMA element 30b enters the high-temperature phase (austenite phase) and thus contracts, and by the contractile force of the second SMA element 30b, the movable member 20 positionally moves to the second position.

In this case, although the first SMA element 30a in the low-temperature phase (martensitic phase) generates the contractile force, the generated contractile force, 0.6 N, is smaller than that of the second SMA element 30b in the high-temperature phase (austenite phase), 2.5 N, such that the first SMA element 30a in the low-temperature phase may not stop positional movement of the movable member 20 to the second position.

Once the movable member 20 positionally moves to the second position in this way, the second coupling member 50b sticks to the second magnet 40b, such that the movable member 20 is separably fixed at the second position.

Since power is supplied to the second SMA element 30b only for 1 second, after the movable member 20 moves to the second position and is positionally fixed at the second position, there is no electric energy supply to the SMA elements 30a and 30b, and in spite of the absence of the electric energy supply, the movable member 20 may maintain a fixed state at the second position due to the second magnet 40b and the second coupling member 50b, and the second SMA element 30b is slowly cooled and enters the low-temperature phase (martensitic phase) after about 10 seconds from the cut-off of the power supply.

Since the above-described SMA actuator 100 includes a pair of SMA elements 30a and 30b which are mounted to positionally move and fix the movable member 20 to one of the first position and the second position, the first position fixing means for separably fixing the movable member 20 at the first position by a magnetic force, and the second position fixing means for separably fixing the movable member 20 at the second position by a magnetic force, after the movable member 20 positionally moves to and is positionally fixed at one of the first position and the second position, it may be maintained at the first position or the second position in spite of the absence of the electric energy supply to both of the SMA elements 30a and 30b.

Therefore, the SMA actuator 100 has largely reduced power consumption, compared to the conventional active SMA actuator 1 which needs continuous electricity supply for the movable member 4 to maintain a fixed state at the first position.

In the SMA actuator 100, the SMA elements 30a and 30b are supplied with electric energy from an external source for a predetermined time of 1 second such that the movable member 20 positionally moves to and is positionally fixed at one of the first position and the second position, thereby removing a need for a separate electric switch, such as a limit switch, to cut off power supply.

Moreover, in the SMA actuator 100, once the SMA elements 30a and 30b in previously cooled states are supplied for a predetermined time of 1 second with electric energy from an external source, the movable member 20 positionally moves between the first position and the second position for 1 second, such that unlike the conventional active SMA actuator 1 having a reaction time of a maximum of 10 seconds, the SMA actuator 100 has a high reaction speed.

In the SMA actuator 100, since the SMA elements 30a and 30b are SMAs which contract in the high-temperature phase and extend in the low-temperature phase, a large force may be easily applied to the movable member 20 by using the contractile force in the high-temperature phase, generated by electric energy.

Moreover, in the SMA actuator 100, the SMA elements 30a and 30b are disposed to apply forces in opposite directions to the movable member 20 in the high-temperature phase, such that the movable member 20 may easily move between the first position and the second position.

As such, the SMA actuator 100 is suitable for applying thereto a two-position control action such as opening/closing of a value for flow rate control.

In the current embodiment, to move the movable member 20 to one of the first position and the second position, electric energy is supplied to the SMA elements 30a and 30b from an external source for a predetermined time of 1 second, but by using a limit switch, electric energy supplied to the SMA elements 30a and 30b may be cut off, at an instance when the movable member 20 positionally moves to one of the first position and the second position and is positionally fixed by the position fixing means 40a, 40b, 50a, and 50b.

While coil-type springs manufactured with a Ni—Ti-based SMA are used as the SMA elements 30a and 30b in the current embodiment, linear wires manufactured with a Ni—Ti-based SMA may also be used.

As is apparent from the foregoing description, by including the pair of SMA elements which are mounted to move and fix the movable member to one of the first position and the second position, the first position fixing means for separably fixing the movable member at the first position by a magnetic force, and the second position fixing means for separably fixing the movable member at the second position by a magnetic force, after the movable member positionally moves to and is positionally fixed at one of the first position and the second position, the movable member may be maintained at the first position or the second position in spite of the absence of the electric energy supply to both of the SMA elements, thereby providing a high reaction speed and remarkably reduced power consumption.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. An actuator which generates an operating force by using shape memory alloy (SMA) elements, the actuator comprising:
    a fixed member comprising:
        a base portion,
        a left side portion, and
        a right side portion;
    a movable member disposed on a top surface of the base portion, wherein the movable member comprises:
        a horizontal portion,
        a vertical portion protruding upwardly from a center of the horizontal portion,
        a first coupling member, and
        a second coupling member, wherein the first and second coupling members are mounted on opposite ends of the horizontal portion;
    a first SMA element mounted onto the left side portion of the fixed member and onto the vertical portion of the movable member;
    a second SMA element mounted onto the right side portion of the fixed member and onto the vertical portion of the movable member;
    a first magnet mounted on the fixed member adjacent to the left side portion of the fixed member; and
    a second magnet mounted on the fixed member adjacent to the right side portion of the fixed member.

2. The actuator of claim 1, wherein the first SMA element and the second SMA element are SMAs which contract in high-temperature phases and extend in low-temperature phases.

3. The actuator of claim 1, wherein the first SMA element and the second SMA element are disposed to apply forces in opposite directions to the movable member in the high-temperature phases.

4. The actuator of claim 1, wherein the first SMA element and the second SMA element are linear wires or coil-type springs.

5. The actuator of claim 1, wherein the first coupling member is a metallic member.

6. The actuator of claim 1, wherein the second coupling member is a metallic member.

7. The actuator of claim 1, wherein the first magnet is a permanent magnet.

8. The actuator of claim 1, wherein the second magnet is a permanent magnet.

9. The actuator of claim 1, wherein the first SMA element comprises a Ni—Ti based SMA.

10. The actuator of claim 1, wherein the second SMA element comprises a Ni—Ti based SMA.

11. The actuator of claim 1, wherein the first and second SMA elements are configured to apply a contractile force of about 0.6 Newtons when in a low-temperature phase.

12. The actuator of claim 1, wherein the first and second SMA elements are configured to apply a contractile force of about 2.5 Newtons when in a high-temperature phase.

13. The actuator of claim 1, wherein the first and second SMA elements are configured to apply a contractile force of about 0.6 Newtons when in a low-temperature phase and the first and second SMA elements are configured to apply a force of about 2.5 Newtons when in a high-temperature phase.

14. The actuator of claim 1, wherein the first and second magnets are configured to apply an attractive force of about 1 Newton.

15. The actuator of claim 1, wherein when in a high-temperature phase either of the first and second SMA elements are configured to apply a contractile force which is greater than an attractive force exerted by either the first or second magnets.

16. The actuator of claim 1, wherein when in a low-temperature phase either of the first and second SMA elements are configured to apply a contractile force which is less than an attractive force exerted by either the first or second magnets.

17. An actuator using shape memory alloy (SMA), the actuator comprising:
- a fixed member;
- a movable member mounted on the fixed member configured to move between a first position and a second position;
- a first SMA element mounted to generate a force configured to move the movable member to the first position;
- a second SMA element mounted configured to generate a force to move the movable member to the second position;
- a first magnet mounted on the fixed member configured to generate a magnetic force to fix the movable member at the first position in such a way that the movable member is separable from the first magnet; and
- a second magnet mounted on the fixed member configured to generate a magnetic force to fix the movable member at the second position in such a way that the movable member is separable from the second magnet.

18. The actuator of claim 17, wherein when in a high-temperature phase either of the first and second SMA elements are configured to apply a contractile force which is greater than an attractive force exerted by either the first or second magnets.

19. The actuator of claim 17, wherein when in a low-temperature phase either of the first and second SMA elements are configured to apply a contractile force which is less than an attractive force exerted by either the first or second magnets.

20. The actuator of claim 17, wherein the first and second SMA elements are configured to apply a contractile force of about 0.6 Newtons when in a low-temperature phase and the first and second SMA elements are configured to apply a force of about 2.5 Newtons when in a high-temperature phase, and wherein the first and second magnets are configured to apply an attractive force of about 1 Newton.

* * * * *